Jan. 4, 1944.  R. W. HULL  2,338,194
REFRIGERATOR CABINET CONSTRUCTION
Filed June 24, 1939  3 Sheets-Sheet 1

Inventor
R. W. Hull
By A. Yates Dowell
Attorney

Jan. 4, 1944. R. W. HULL 2,338,194
REFRIGERATOR CABINET CONSTRUCTION
Filed June 24, 1939 3 Sheets-Sheet 2

Inventor
R. W. Hull
By A. Yates Dowell
Attorney

Jan. 4, 1944. R. W. HULL 2,338,194
REFRIGERATOR CABINET CONSTRUCTION
Filed June 24, 1939 3 Sheets-Sheet 3

Inventor
R. W. Hull
By A. Yates Dowell
Attorney

Patented Jan. 4, 1944

2,338,194

UNITED STATES PATENT OFFICE 2,338,194

REFRIGERATOR CABINET CONSTRUCTION

Robert Winter Hull, Connersville, Ind., assignor to Rex Manufacturing Co., Inc., Connersville, Ind., a corporation of Indiana Application June 24, 1939, Serial No. 281,019

7 Claims. (Cl. 220—9)

This invention relates to refrigerator cabinet construction, and has for its object to provide a cabinet made up of parts fabricated and assembled in a manner such that:

The cabinet may be manufactured complete with a minimum of time and assembly labor thereby reducing the cost of the cabinet while maintaining high standards of quality;

The walls and supporting structure of the cabinet may be made substantially wholly of sheet metal without sacrificing ruggedness and rigidity while speeding up time of fabrication and assembly;

The sheet metal parts may be united at the lines of jointure solely by spot welding and the welding carried out in one operation while the assembled parts remain in one position, thereby materially reducing the time and labor incident to welding;

The cabinet may be easily insulated with low cost loose insulation instead of the preformed type, the method insuring complete and efficient insulation throughout every part of the spaces to be insulated;

And other advantages ensue which will become apparent in view of the following description taken in conjunction with the drawings, wherein.

Figure 1:
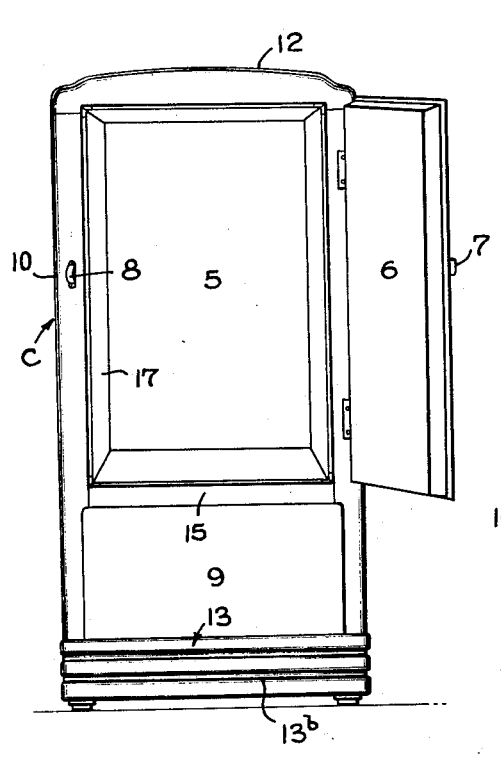
Fig. 1 is a view in front elevation of a cabinet constructed in accordance with the present method, the door being shown open.

The present method is adaptable to any shape and design of cabinet. The cabinet generally indicated at C Fig. 1 is illustrative and is provided with the usual food compartment 5 and door 6 therefor, the door being shown as of the exterior latch type, the latch lever being indicated at 7 and the latch member at 8. In the type of cabinet shown, the machinery compartment is at the base of the cabinet and is normally closed by a door or panel 9.

Figure 2:
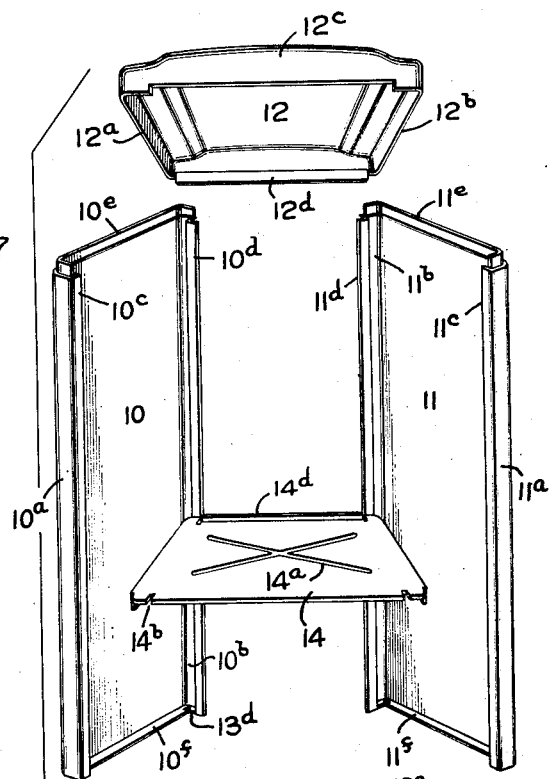
Fig. 2 is a view of the parts which go to make up the outer shell top and base member of the cabinet in disassembled relation.

The outer wall and base supporting structure comprises side panels 10 and 11, a top panel 12, a base member 13, a bottom pan or insulation support 14, and a center rail panel 15, all of which are shown in disassembled relation in Fig. 2. The side panels 10 and 11 are provided, respectively, with front and rear walls or wall portions 10a, 10b and 11a, 11b which terminate in flanges 10c, 10d and 11c, 11d. The upper end of each panel is formed with an upwardly projecting welding flange or lap 10e, 11e adapted to telescope into and be welded to side walls 12a, 12b of the top panel 12; and the lower end of each panel is formed with an inturned welding flange 10f, 11f adapted to rest on and be welded to flanges 13a at the top of the base member 13.

The top 12, in addition to the side walls 12a, 12b, is provided with a front recessed wall 12c and a rear back panel connecting flange 12d.

Figure 8:
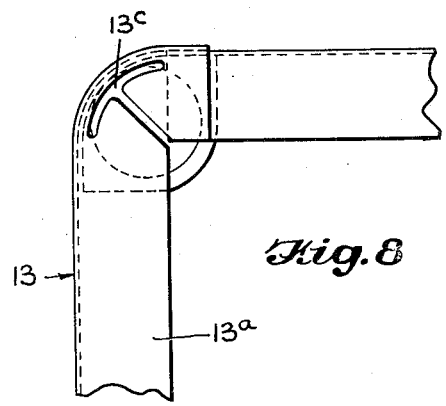
Fig. 8 is an enlarged fragmentary detail view in plan of a corner portion of the base member; and, Fig. 9 is a vertical section taken through the assembled and welded outer shell of the cabinet prior to receiving the food compartment liner and insulation material.

The base member or unit 13 may be formed of sheet metal of sufficient gauge to give the desired strength and rigidity and is preferably ribbed or corrugated in a horizontal plane as at 13b. To facilitate welding the channels are slotted at the corners of the base as at 13c, note particularly Fig. 8, said slots mating with similarly shaped slots 13d formed in the base flanges of the side panels 10 and 11 and which latter slots are visible in Fig. 2.

Figure 7:
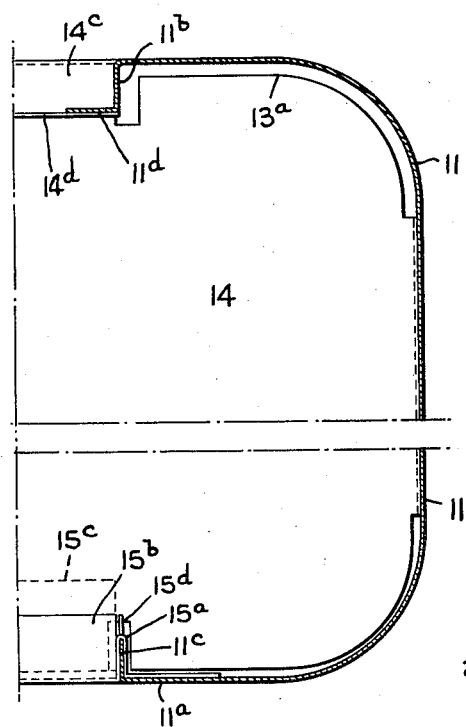
Fig. 7 is a horizontal section taken substantially on the line 7—7, Fig. 4.

Beneath the food compartment liner, to be subsequently referred to, and spaced from the bottom thereof is the bottom pan or insulation support 14. The body of this member is preferably formed with strengthening ribs 14a. The front edge of the pan is formed with slots 14b in which coacting portions 15a formed on the center rail panel 15 engage. At its rear edge the metal of the pan is doubled upon itself providing a ledge 14c, Fig. 7, and an upstanding flange 14d, the bottom of the back panel 16 resting on the ledge 14c and being secured to the flange 14d. At its opposite sides the pan is formed with downturned flanges 14e which abut against the side panels and the cabinet end are welded thereto.

The center rail panel 15 is preferably shaped as best shown in Fig. 2, the metal being doubled upon itself at opposite extremities of the member to provide the slot-engaging portions 15a and beyond this terminating in free ends which are welded to the front walls of the side panel. This center rail panel is channel-shaped in cross section, a lap flange 15d being provided at the top which engages over the pan 14 between the slots 14b, and a flange 15c being provided at the bottom, the spacing of these upper and lower flanges constituting the width of the rail as viewed in Fig. 1. At the point where the slot-engaging portions 15a receive the adjacent flanges 10c, 11c of the side panels, the latter are notched as at 15d, note Fig. 7.

Figure 3:
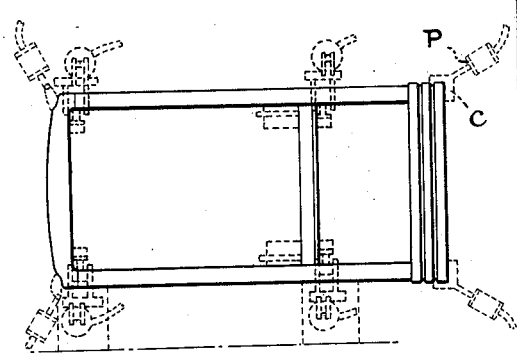
Fig. 3 is a view in elevation illustrating the parts of Fig. 2 clamped in welding relation in a welding machine, only certain portions of the latter being shown and illustrated in dotted lines.
Figure 9:
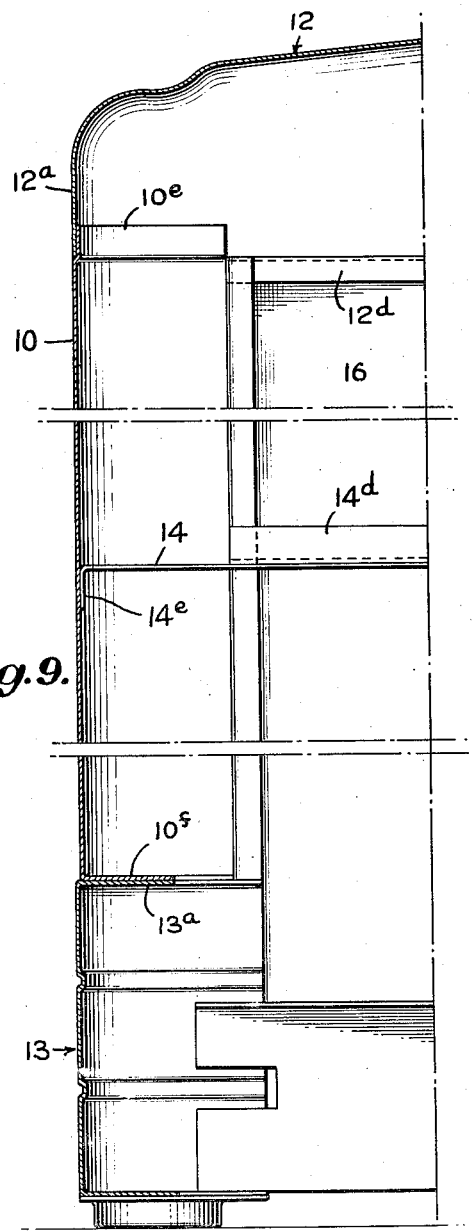

The preferred manner of assembling the parts for the welding machine is to first assemble the side panels 10 and 11 with the bottom pan 14 and the center rail panel 15 connected therebetween. These parts may be disposed in a suitable support or holder, not shown, the flanges 14e of the bottom pan abutting against the opposite inner sides of the side panels with the portions 15a of the center rail panel engaged in the slots 14b of the bottom pan and the opposite ends of the center rail panel engaging the inner faces of the front walls 10a and 11a of the side panels, note particularly Figs. 7 and 9. The base unit 13 and top panel 12 are then positioned at opposite ends of the side panels with the flanges 10f and 11f abutting the top flange 13a of the base so that the slots 13c and 13d are in substantial registering or mating relation; and the top welding flanges 10e and 11e of the side panels telescoped into the side walls 12a and 12b of the top panel. The unit is then placed in the welding machine substantially as illustrated in Fig. 3, where the welding pistons are indicated in dotted lines at P and the clamps at c. Thus the welder serves as a fixture for holding the parts in proper welding relation. While in this position, the welder operates and the required spot welds are made before the cabinet is removed. In the example shown, the welding machine embodies approximately 76 separate spot welders, three transformers being used and three welds being made at a time until all the welds are completed. The welding time is approximately 17 seconds.

Figure 4:
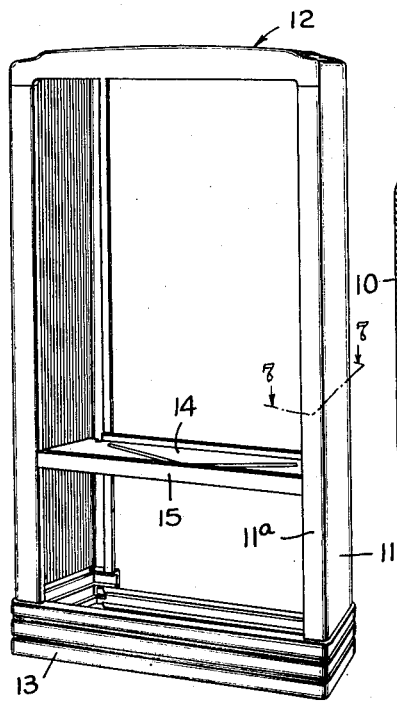
Fig. 4 is a view in perspective of the unit of Fig. 3 after the welding operation.
Figure 6:
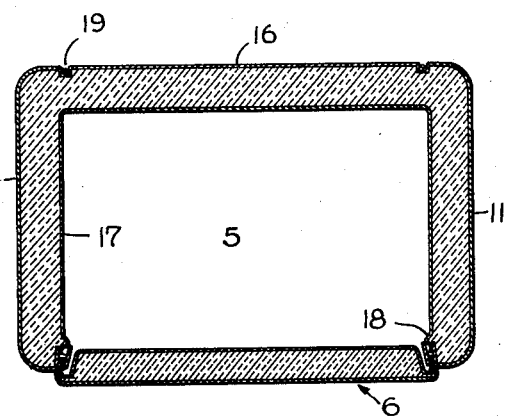
Fig. 6 is a horizontal section taken through the cabinet of Fig. 1 but with the door shown closed.

After the welding is completed, the clamps are released and the welded unit consisting of the outer shell or side walls, top, base and bottom pan and front panel assembly removed, this unit being illustrated in upright position in Fig. 4. The welded unit is then painted, enameled or otherwise coated, the joints sealed, and the food compartment liner 17 and door casing frame 18 applied. Any desired type or shape of food compartment liner may be used. A suitable casing frame is provided, the front flange of the food compartment being secured to the adjacent side edge of the casing and the opposite side edge of the casing secured to the front walls of the side panels, top panel and the center rail panel, note Fig. 6.

Figure 5:
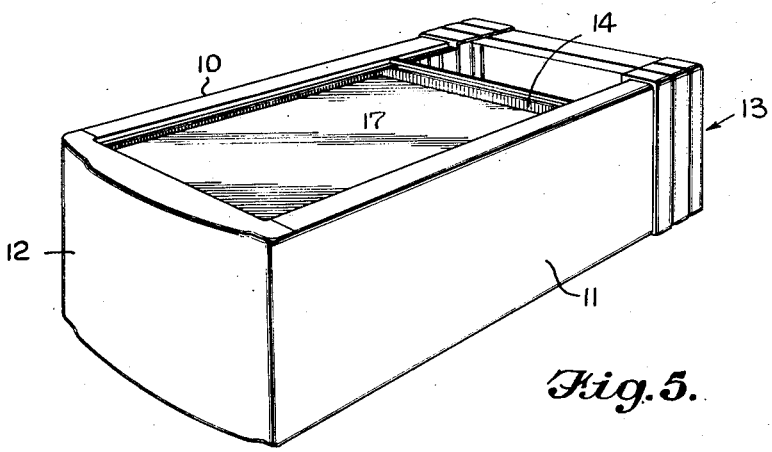
Fig. 5 is a view in perspective of the outer shell of Fig. 4 after the liner has been applied, the cabinet being laid on its face ready to receive the insulation.

The cabinet is now ready for the insulating operation. This operation is preferably carried on by laying the cabinet on its face as illustrated in Fig. 5, and the insulation inserted from the rear. The insulation material used is preferably of the loose, fibrous type which may be readily inserted in the space between the food compartment liner and the adjacent outer walls of the cabinet. By stuffing the insulation in from the rear of the cabinet, all insulation cavities are rendered accessible, which is not possible when applying the insulation from any other position. By using a loose or stuffed type insulation, every crack and crevice is filled, leaving no joints, as ofttimes happens with independently sealed or wrapped insulation slabs. Furthermore, there is an appreciable economy in applying insulation in bulk form of this type in contradistinction to insulation of the prefabricated type.

After the cabinet has been insulated, the back plate 16 is placed over the rear opening and secured to the coacting flanges 10b, 11b of the side panels, the rear depending flange 12d of the top panel and the upstanding flange 14d of the bottom pan. The joint around the back plate is preferably channel-shaped to provide a sealing groove 19 in the base of which fastening screws or like members are inserted, the sealing material being applied in this groove over the screws and joint. By sealing the back panel from the outside, or at exposed points, it can always be definitely ascertained that the cabinet is properly sealed; and when the cabinet is displayed to a prospective customer, the seal is clearly visible so that the customer thoroughly understands that there is an efficient seal.

From the foregoing description taken in conjunction with the drawings it will be apparent that the method results in certain outstanding advantages, among which may be mentioned the welding together of the outer shell and associated parts at one time and while the parts are held in a fixture ensuring proper relationship of the parts; the ease, economy and efficiency of the insulating and sealing operation; and the general economy in manufacture while at the same time producing a cabinet wherein the parts consist practically solely of sheet metal connected together in rigid and endurable relation.

All the parts are so constructed that joints are provided which insure proper connection of the respective parts as well as a relatively easy and efficient weld and maximum strength after welding.

It will be understood that certain changes in the steps of the method and the construction and design of the parts may be made without departing from the spirit or scope of the invention as defined in the appended claims.

What is claimed is:

1. In a refrigerator cabinet having an outer sheet metal shell and an inner food compartment liner, said outer shell including side panels having front and rear marginal walls of the cabinet, a bottom pan or insulation support underlying the food compartment liner in spaced relation with respect thereto, said bottom pan having side flanges secured to the adjacent side panels of the cabinet, a center rail panel of sheet metal having a horizontal portion secured to said pan and a vertical portion forming the center rail or panel of the cabinet, said bottom pan being notched and said center rail panel having the metal at opposite ends thereof bent upon itself providing looped portions engaging in said notches, the side panels having their marginal edges thereof engaging in said looped portions, the metal beyond said looped portions being extended and fitting against the inner front wall of the side panels and welded thereto.

2. In a refrigerator cabinet having a food compartment, sheet metal side panels having their front and rear edge portions shaped to constitute front and rear marginal walls of the cabinet, a deeply drawn top panel, a bottom pan or insulation support underlying the food compartment, a base member, and a center rail panel, said side panels being provided with substantially vertically extending flanges at their upper ends telescoped into coacting side walls of the top panel and at their lower ends being provided with substantially horizontal flanges seated upon said base member, said center rail panel and the front marginal edge of said bottom pan having interlocking portions and said center rail panel also having flanges abutting the adjacent portions of the side panels, said parts being welded together along their lines of jointure into a substantially integral unit, a food compartment liner and casing frame telescoped into the opening defined by said side panels, top panel and bottom pan, means insulating the space between said liner and outer walls, said bottom pan having a rear substantially vertically extending flange, and a back panel overlying but spaced from the back wall of the liner and having its lower edge engaging the rear flange of said bottom pan and its side and top edges engaging flanged portions of the side and top panels.

3. In a refrigerator cabinet having an outer sheet metal shell and an inner food compartment liner, said outer shell including side panels having front and rear marginal portions shaped to constitute front and rear marginal walls of the cabinet, said side panels being provided at their upper ends with upstanding inset flanges and at their lower ends with inturned substantially horizontal flanges, a deeply drawn top panel telescoped over said upstanding inset flanges, a sheet metal base member having top flanges mating with the bottom inturned flanges of the side panels, a bottom pan or insulation support underlying the food compartment liner and having side flanges abutting the adjacent side panels, a front center rail panel member of sheet metal having a horizontal lap flange engaging over the front marginal portion of the bottom pan and laterally projecting portions mating with the adjacent marginal edges of the side panels, said side panels, top panel, base member and bottom pan being welded together along the lines of juncture into a substantially integral unit.

4. In a refrigerator cabinet having a food compartment; side panels and a base connected together providing the outer walls and supporting structure of the cabinet, a bottom pan serving as an insulation support underlying the food compartment in spaced relation with respect thereto, said pan being formed with opposed side flanges abutting the adjacent inner surfaces of the side panels and secured as by welding to said surfaces, the front marginal edge of said pan being recessed, a sheet metal center rail panel formed with rearwardly extending projections engaging in said recesses to thereby interlock the rail with the pan, the opposite ends of the said center rail panel being extended and connected to the said side panels.

5. In a refrigerator cabinet having a food compartment; side panels and a base connected together providing the outer walls and supporting structure of the cabinet, a bottom pan serving as an insulation support underlying the food compartment in spaced relation with respect thereto, said pan being formed with opposed side flanges abutting and secured as by welding to the adjacent side panels and a rear upstanding flange inwardly from the rear edge of the pan, the front marginal edge of said pan being recessed, an angle-shaped center rail panel having rearwardly-extending projections engaging in said notches and a substantially horizontal lap flange secured to said pan, the front horizontal portion of the center rail panel being extended at opposite ends and secured to said side panels, and a back plate covering the back of the cabinet in rear of the liner and having its lower edge engaging the rear flange of the bottom pan.

6. In a refrigerator cabinet having a food compartment and a machinery compartment, sheet metal side panels extending for substantially the full height of said compartments and having front and rear edge portions shaped to constitute the front and rear marginal walls of the cabinet and offset top marginal edges to provide assembling and welding flanges, a deeply-drawn top panel having front and rear depending flanges constituting the front and rear walls of the cabinet above the food compartment and side flanges extending down to and in telescoping relation with the offset marginal top edges of the side panels, a bottom pan disposed between the food and machinery compartments and providing an insulation support at the base of the food compartment, said bottom pan having side welding flanges engaging the adjacent inner surfaces of the side panels and a rear back-panel-mounting flange, a center rail panel constituting the front face of the cabinet between the machinery and food compartments, said center rail panel and the front marginal edge of the bottom pan having portions in interlocking engagement and the opposite ends of the center rail panel terminating in laterally outwardly-projected portions shaped to interlock with the adjacent front wall portions of the side panels, a metallic base member having a top welding flange in engagement with a mating flange formed on the bottom edges of the side panels, said parts all being welded together along their lines of jointure into a substantially integral unit, a food compartment liner and casing frame telescoped into the opening defined by the said side panels, top panel, center rail panel and bottom pan, means insulating the space between the liner and adjacent outer walls, and a back panel overlying but spaced from the back wall of the liner and having its side and top edges secured to the rear edges of the side panels and the rear depending edge of the top panel and its lower edge secured to the rear flange of the bottom pan.

7. In a refrigerator cabinet having a food compartment and a machinery compartment, sheet metal side panels extending for substantially the full height of said compartments and having front and rear portions shaped to constitute the front and rear marginal walls of the cabinet and offset top marginal edges to provide assembling and welding flanges, a deeply drawn top panel having front and rear depending flanges constituting the front and rear walls of the cabinet above the food compartment and side flanges extending down to and in telescoping relation with the offset marginal top edges of the side panels, a bottom pan disposed between the food and machinery compartments and providing an insulation support at the base of the food compartment, said bottom pan having side welding portions engaging the inner surfaces of the side panels and a rear back-panel-mounting portion, a center rail panel constituting the front face of the cabinet between the machinery and food compartments, said central rail panel and the front marginal edge of the bottom pan having portions in interlocking engagement and the opposite ends of the central rail panel terminating in laterally outwardly-projected portions shaped to interlock with the adjacent front wall portions of the side panels, said parts all being welded together along the lines of jointure into a substantially integral unit.

ROBERT WINTER HULL.